United States Patent
Etzrodt et al.

(10) Patent No.: US 7,351,474 B2
(45) Date of Patent: *Apr. 1, 2008

(54) PIGMENT PREPARATIONS

(75) Inventors: Guenter Etzrodt, Stuttgart (DE); Achim Grefenstein, Altrip (DE); Wieland Jenet, Worms (DE); Robert Bayer, Sinsheim (DE); Reinhold Rieger, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 229 days.

This patent is subject to a terminal disclaimer.

(21) Appl. No.: 10/416,756

(22) PCT Filed: Nov. 15, 2001

(86) PCT No.: PCT/EP01/13230

§ 371 (c)(1), (2), (4) Date: May 15, 2003

(87) PCT Pub. No.: WO02/40576

PCT Pub. Date: May 23, 2002

(65) Prior Publication Data

US 2004/0044119 A1  Mar. 4, 2004

(30) Foreign Application Priority Data

Nov. 16, 2000 (DE) .................................. 100 57 165

(51) Int. Cl.
*B32B 5/16* (2006.01)

(52) U.S. Cl. .................. 428/407; 428/327; 428/357; 428/403; 428/412; 428/473.5; 428/474.4; 428/475.2; 428/476.3; 428/480; 428/483; 427/212; 427/213.3; 427/220; 427/221

(58) Field of Classification Search ................ 428/357, 428/402, 403, 404, 407, 405
See application file for complete search history.

(56) References Cited

U.S. PATENT DOCUMENTS

| | | | |
|---|---|---|---|
| 3,737,409 A | 6/1973 | Fox | |
| 4,983,661 A * | 1/1991 | Ali et al. | 524/423 |
| 5,196,480 A | 3/1993 | Seitz et al. | |

FOREIGN PATENT DOCUMENTS

| | | |
|---|---|---|
| DD | 226 574 | 8/1985 |
| DE | 1 260 135 | 2/1968 |
| DE | 14 95 730 | 4/1969 |
| DE | 28 26 925 | 1/1980 |
| DE | 31 49 357 | 6/1983 |
| DE | 31 49 358 | 6/1983 |
| DE | 32 27 555 | 1/1984 |
| DE | 36 01 419 | 7/1987 |
| DE | 38 39 865 | 5/1990 |
| DE | 44 36 047 | 4/1995 |
| DE | 199 07 703 | 8/2000 |
| DE | 19 28 774 | 12/2000 |
| EP | 0 230 282 | 7/1987 |
| EP | 0 255 500 | 2/1988 |
| EP | 0 269 861 | 6/1988 |
| EP | 0 847 852 | 6/1998 |
| WO | 98 38253 | 9/1998 |
| WO | 98 58985 | 12/1998 |
| WO | 99 48988 | 9/1999 |

OTHER PUBLICATIONS

M. Strickler et al. Ullmann's Encyclopedia of Industrial Chem., vol. A 21, pp. 473-486 1992.
Guenter Oertel: "Kunststoff-Handbuch, 7, Polyurethane" pp. 170-246 and 428-473 1983.
W. Scholtan et al.: "Bestimmung der tellchengroessenvertellung von latices mit der ultrazentrifuge" Kolloid-Z Und Z. Polymere, vol. 250, pp. 782-796 1972.
Applied Polymer Science, vol. 9, pp. 2929-2938 1965.
Daniel Chauvel, ACs Polymer Preprints, vol. 15, pp. 329-333 1974.

* cited by examiner

*Primary Examiner*—Sheeba Ahmed
(74) *Attorney, Agent, or Firm*—Oblon, Spivak, McClelland, Maier & Neustadt, P.C.

(57) ABSTRACT

A pigment formulation in granule form obtainable by a) dispersing at least two different pigments (A) in a solution of a thermoplastic polymer (B) in an organic solvent in the presence or absence of a dispersant (C), and b) applying as a layer the dispersion produced in step a) to granules of a thermoplastic polymer (B'), which is the same as the polymer (B), with removal of the solvent, wherein the pigment formulation includes the granules of the thermoplastic polymer (B'); and a coating on the granules of the thermoplastic polymer (B'), where the coating comprises the at least two different pigments (A) and the thermoplastic polymer (B).

21 Claims, No Drawings

PIGMENT PREPARATIONS

The present invention relates to novel pigment formulations comprising (A) at least two different pigments, (B) at least one thermoplastic polymer, and if desired (C) a dispersant, and obtainable by a) dispersing the pigments (A) in a solution of the polymer (B) in an organic solvent in the presence or absence of a dispersant (C), and
b) subsequently granulating with removal of the solvent.

The invention further relates to processes for preparing these pigment formulations and for coloring polymer molding compounds using the pigment formulations, and also to polymer molding compounds, composite films and shaped plastic parts colored with the pigment formulations.

In the coloring of plastics, a variety of problems may occur that are attributable to the pigments used as colorants. Plastics colored with transparent pigments or with luster pigments often lack the desired appearance.

Colorations of plastics with pigments are transparent when the pigment particles, commonly <15 mm in size, are present in fine distribution. These small primary pigment particles, however, have a strong tendency to agglomerate. In the preparation of paints, such agglomerates are comminuted with great effort in special mills. In the case of incorporation into plastics, however, it is generally impossible, even when using corotating twin-screw extruders, to produce transparent colorations with hard-to-disperse pigments, such as transparent iron oxide pigments, carbon black pigments and perylene pigments, these colorations being free from inhomogeneities, without disproportionately damaging the plastic.

In the case of the luster pigments based on platelet-shaped pigment particles, incorporation into the plastic is often observed to be accompanied by a change in pigment particle size and morphology. The colorations obtained are then less attractive coloristically than coatings produced with these pigments, and lack brightness and the typical deep-seated satin sheen.

Particularly great difficulties occur when a plastic is to be colored simultaneously with a luster pigment that cannot be subjected to mechanical stress and with a transparent color pigment that is hard to disperse. However, pigment combinations of this kind can give particularly interesting coloristic effects.

These disadvantages have a deleterious effect in particular on the manufacture of exterior bodywork components from plastic and lead to marked coloristic deviations of painted metal components from the shaped plastic parts colored with the same pigments. Because of their lower weight, however, shaped plastic parts are of great interest for the automotive industry compared with metal components.

It is an object of the present invention to facilitate the coloring of plastics with pigments in general and hence also to permit coloristically attractive plastics colorations to be produced using pigment combinations.

We have found that this object is achieved by the pigment formulations defined at the outset.

We have also found a process for preparing these pigment formulations, which comprises a) dispersing the pigments (A) in a solution of polymer (B) in an organic solvent in the presence or absence of a dispersant (C), and
b) subsequently granulating with removal of the solvent.

We have also found a process for coloring polymer molding compounds which comprises incorporating the pigment formulations of the invention into the polymer molding compounds.

The coloring component (A) of the pigment formulations of the invention is formed by at least two different pigments from the group consisting of organic chromatic, white and black pigments (color pigments), liquid-crystal pigments, inorganic color pigments, luster pigments, and the inorganic pigments commonly used as fillers.

The pigments may be combined with one another as desired. Suitable examples include:
combinations of at least two organic color pigments, combinations of at least two inorganic color pigments;
combinations of at least one organic color pigment with at least one inorganic color pigment;
combinations of at least two luster pigments;
combinations of at least one transparent organic color pigment (especially chromatic and/or black pigment) with at least one luster pigment
combinations of at least one transparent inorganic color pigment (especially chromatic and/or black pigment) with at least one luster pigment
combinations of at least one transparent organic color pigment (especially chromatic and/or black pigment) and at least one transparent inorganic color pigment (especially chromatic and/or black pigment) with at least one luster pigment.

The following may be given as specific examples of suitable organic color pigments:
monoazo pigments: C.I. Pigment Brown 25; C.I. Pigment Orange 5, 36 and 67; C.I. Pigment Red 3, 48:2, 48:3, 48:4, 52:2, 63, 112 and 170; C.I. Pigment Yellow 3, 74, 151 and 183;
disazo pigments: C.I. Pigment Red 144, 166, 214 and 242; C.I. Pigment Yellow 83;
anthraquinone pigments: C.I. Pigment Yellow 147 and 177; C.I. Pigment Violet 31;
benzimidazole pigments: C.I. Pigment Orange 64;
quinacridone pigments: C.I. Pigment Orange 48 and 49; C.I. Pigment Red 122, 202 and 206; C.I. Pigment Violet 19;
quinophthalone
pigments: C.I. Pigment Yellow 138;
diketopyrrolopyrrole
pigments: C.I. Pigment Orange 71 and 73; C.I. Pigment Red, 254, 255, 264 and 270;
dioxazine pigments: C.I. Pigment Violet. 23 and 37;
indanthrone pigments: C.I. Pigment Blue 60;
isoindoline pigments: C.I. Pigment Yellow 139 and 185;
isoindolinone pigments: C.I. Pigment Orange 61; C.I. Pigment Yellow 109 and 110;
metal complex
pigments: C.I. Pigment Yellow 153;
perinone pigments: C.I. Pigment Orange 43;
perylene pigments: C.I. Pigment Black 32; C.I. Pigment Red 149, 178 and 179; C.I. Pigment Violet 29;
phthalocyanine
pigments: C.I. Pigment Blue 15, 15:1, 15:2, 15:3, 15:4, 15:6 and 16; C.I. Pigment Green 7 and 36;
C.I. Pigment Black 1 (aniline black).
Examples of suitable inorganic color pigments are:
white pigments: titanium dioxide (C.I. Pigment White 6), zinc white, pigment grade zinc oxide; zinc sulfide, lithopone;
black pigments: black iron oxide (C.I. Pigment Black 11), iron manganese black, spinel black (C.I. Pigment Black 27); carbon black (C.I. Pigment Black 7);

chromatic pigments: chromium oxide, chromium oxide hydrate green; chrome green (C.I. Pigment Green 48); cobalt green (C.I. Pigment Green 50);
ultramarine green;
cobalt blue (C.I. Pigment Blue 28 and 36); ultramarine blue; manganese blue;
ultramarine violet; cobalt violet and manganese violet;
red iron oxide (C.I. Pigment Red 101); cadmium sulfoselenide (C.I. Pigment Red 108); molybdate red (C.I. Pigment Red 104); ultramarine red;
brown iron oxide, mixed brown, spinel phases and corundum phases (C.I. Pigment Brown 24, 29 and 31), chrome orange;
yellow iron oxide (C.I. Pigment Yellow 42); nickel titanium yellow (C.I. Pigment Yellow 53; C.I. Pigment Yellow 157 and 164); chrome titanium yellow; cadmium sulfide and cadmium zinc sulfide (C.I. Pigment Yellow 37 and 35); chrome yellow (C.I. Pigment Yellow 34); bismuth vanadate (C.I. Pigment Yellow 184).

Examples that may be mentioned of inorganic pigments commonly used as fillers include transparent silicon dioxide, ground quartz, aluminum oxide, aluminum hydroxide, natural micas, natural and precipitated chalk, and barium sulfate.

Besides the organic liquid-crystal pigments, the luster pigments or effect pigments constitute a particularly interesting class of suitable pigments.

The optical effect of the luster pigments is based on the directed reflection of light on the predominantly sheetlike, mutually parallel-oriented, metallic or strongly light-refracting pigment particles. Depending on the composition of the pigment platelets, interference, reflection and absorption phenomena produce angle-dependent color and lightness effects.

The luster pigments can be either single-phase or multiphase in structure.

As single-phase luster pigments, platelet-shaped metal pigments such as the commercially available aluminum flakes are of particular interest.

The luster pigments of multiphase structure may be based on platelet-shaped substrate particles which are coated one or more times, or on particles., again with a layerlike structure, which are prepared by successively applying the desired layer materials, in the manner of a film, to a support sheet, subsequently removing the support sheet from. the multilayer film, and comminuting said film to pigment particle size.

In the case of the first-mentioned variant, the plateletshaped metal pigments already mentioned, especially the aluminum flakes, and oxidic platelets such as platelets of preferably aluminum- and manganese-doped iron(III) oxide and mica platelets represent preferred substrate materials. In the case of the second-mentioned variant, materials used for the central layer are preferably metals such as aluminum and oxides such as silicon dioxide. With both variants, the coating materials used commonly include metal oxides and metals.

Examples of singly coated pigment platelets that may be mentioned include mica platelets and aluminum flakes coated with titanium dioxide, iron(III) oxide or lower titanium oxides and/or titanium oxynitrides. Goniochromatic luster pigments, which display a particularly pronounced angle-dependent color change, may be obtained by coating the substrate platelets (e.g. aluminum flakes, iron oxide platelets or mica platelets already coated with titanium dioxide) with alternating layers of materials of low refractive index, such as silicon dioxide and magnesium fluoride, and materials of high refractive index, such as iron(III) oxide, titanium dioxide, and the other titanium compounds already mentioned above.

Multiphase luster pigments of this kind are known and are available commercially, for example, under the names Paliocrom® and Variocrom® (BASF), Iriodin®, Xirallic® and Colorstream® (Merck), and Chromaflaire® (Flex Products).

As component (B), the pigment formulations of the invention comprise one or more thermoplastic polymers.

Examples of preferred polymers (B) are the acrylic resins, styrene polymers, polycarbonates, polyamides, polyesters, thermoplastic polyurethanes, polyethersulfones, polysulfones, vinyl polymers or blends thereof, in which context the acrylic resins, the styrene polymers and the thermoplastic polyurethanes are particularly suitable.

Suitable acrylic resins that may be mentioned include the polyalkyl esters and/or polyaryl esters of (meth)acrylic acid, poly(meth)acrylamides and poly(meth)acrylonitrile. Preferred acrylic resins are polyalkyl methacrylates, including impact-modified forms thereof, with particular preference being given to polymethyl methacrylate (PMMA) and impact-modified polymethyl methacrylate (HI (High-Impact)-PMMA). Preferably, the PMMA contains a fraction of generally not more than 20% by weight of (meth)acrylate comonomers such as n-butyl (meth)acrylate or methyl acrylate. HI-PMMA is made impact-resistant by means of appropriate additions. Examples of suitable impact modifiers include EPDM rubbers, polybutyl acrylates, polybutadiene, polysiloxanes or methacrylate-butadiene-styrene (MBS) and methacrylate-acrylonitrile-butadiene-styrene copolymers. Suitable impact-modified PMMAs are described, for example, by M. Stickler and T. Rhein in Ullmann's encyclopedia of industrial chemistry Vol. A21, pages 473-486, VCH Publishers Weinheim, 1992, and by H. Domininghaus, Die Kunststoffe und ihre Eigenschaften, VDI-Verlag Düsseldorf, 1992. Suitable polymethyl methacrylates are known, moreover, to the skilled worker and are available, for example, under the commercial brand names Lucryl® (BASF) and Plexiglas® (Röhm GmbH).

Suitable styrene polymers include all (co)polymers composed in whole or in part of vinylaromatic compounds. Suitable vinylaromatic compounds are, for example, styrene and derivatives of styrene such as mono- or polyalkyl- and/or -halo-substituted styrene and also corresponding naphthyl compounds. It is preferred to employ styrene copolymers. These include, for example, graft copolymers of acrylonitrile and styrene on butadiene rubbers, also known as ABS polymers (e.g., the commercial product Terluran® from BASF), graft copolymers of styrene and acrylonitrile on polyalkyl acrylate rubbers, also known as ASA polymers (e.g., the commercial product Luran® S from BASF), or styrene-acrylonitrile copolymers, also known as SAN copolymers (e.g., the commercial product Luran® from BASF). Suitable styrene polymers are likewise described in detail below under the polymer materials that are suitable for injection backmolding. Styrene polymers particularly preferred as polymer (B) are ASA polymers.

Suitable polycarbonates are known per se. For the purposes of the invention, polycarbonates include copolycarbonates. The (co)polycarbonates preferably have a molecular weight (weight average figure $M_w$, determined by means of gel permeation chromatography in tetrahydrofuran against polystyrene standards) in the range from 10,000 to 200,000 g/mol. Preferably, $M_w$ is situated in the range from 15,000 to 100,000 g/mol. This corresponds to relative solution viscosities in the range from 1.1 to 1.5, measured in 0.5% strength by weight solution in dichloromethane at 25° C., preferably from 1.15 to 1.33.

Polycarbonates are obtainable, for example, in accordance with the processes of DE-C-1 300 266 by interfacial polycondensation or in accordance with the process of DE-A-14 95 730 by reaction of diphenyl carbonate with bisphenols. The preferred bisphenol is 2,2-di(4-hydroxyphenyl)propane, commonly known as bisphenol A.

Instead of bisphenol A, it is also possible to use other aromatic dihydroxy compounds, especially 2,2-di(4-hydroxyphenyl)pentane, 2,6-dihydroxynaphthalene, 4,4'-dihydroxydiphenylsulfane, 4,4'-dihydroxydiphenyl ether, 4,4'-dihydroxydiphenyl sulfide, 4,4'-dihydroxydiphenylmethane, 1,1-di(4-hydroxyphenyl)ethane, 4,4-dihydroxybiphenyl or dihydroxydiphenylcycloalkanes, preferably dihydroxydiphenylcyclohexanes or dihydroxycyclo-pentanes, especially 1,1-bis(4-hydroxyphenyl)-3,3,5-trimethylcyclohexane, and also blends of the aforementioned dihydroxy compounds.

Particularly preferred polycarbonates are those based on bisphenol A alone or together with up to 80 mol % of the aforementioned aromatic dihydroxy compounds.

It is also possible to use copolycarbonates in accordance with U.S. Pat. No. 3,737,409. Of particular interest are copolycarbonates based on bisphenol A and bis(3,5-dimethyl-4-hydroxyphenyl) sulfone and/or 1,1-bis(4-hydroxyphenyl)-3,3,5-trimethylcyclohexyl, which are notable for high heat distortion resistance.

Available commercially, for example, are the polycarbonates Makrolon® (Bayer) and Lexan® (GE Plastics).

Suitable polyamides (PA) may be polycondensation products of diamines and dicarboxylic acids, e.g., adipic acid and hexamethylenediamine, or of amino acids, e.g., aminoundecanoic acid, or may be prepared by ring-opening polymerization of lactams, e.g., caprolactam or laurolactam. By way of example, mention may be made of Ultramid® (BASF AG), Zytel® and Minlon® (Du Pont), Sniamid®, Technyl® and Amodel® (Nyltech), Durethan® (Bayer), Akulon® and Stanyl® (DSM), Grilon®, Grilamid®, and Grivory® (EMS), Orgamid® and Rilsan® (Atochem), and Nivionplast® (Enichem).

As polyamides it is also possible to use blends of polyamides and polyethylene ionomers, e.g., ethene-methacrylic acid copolymers, containing for example sodium, zinc and/or lithium counterions (inter alia Surlyn® (DuPont)).

Suitable polyesters include the relatively high to high molecular mass esterification products of dibasic acids, especially terephthalic acid, with dihydric alcohols, especially ethylene glycol. Among the polyalkylene terephthalates, polyethylene terephthalate (PET; Arnite® (Akzo), Grilpet® (EMS-Chemie), Valox® (GEP)) is particularly suitable.

Thermoplastic polyurethanes (TPUs) are, ultimately, the reaction products of diisocyanates and long-chain diols. Relative to the polyurethane foams prepared from polyisocyanates (containing at least three isocyanate groups) and polyhydric alcohols (containing at least three hydroxyl groups), especially polyetherpolyols and polyesterpolyols, thermoplastic polyurethanes exhibit little if any crosslinking and, accordingly, have a linear structure. Thermoplastic polyurethanes are well known to the skilled worker and are described, for example, in Kunststoff-Handbuch, Volume 7, Polyurethanes, edited by G. Oertel, 2nd Edition, Carl Hanser Verlag, Munich, 1983, especially on pages 428-473. As a commercially available product, mention may be made here, for example, of Elastolan® (Elastogran).

The polymer classes of the polyethersulfones and polysulfones are likewise known to the skilled worker and are available commercially under the trade names Ultrason® E and Ultrason® S.

As a suitable vinyl polymer mention may, finally, be made of polyvinyl chloride (PVC), for example.

It is preferred to use from 0.1 to 60% by weight, in particular from 5 to 20% by weight, of the pigment blend (A), based on the 40 polymer (B).

The polymer (B) envelops the pigment particles and prevents agglomeration even of very fine pigment particles. It "passivates" finely divided metal pigments, such as aluminum flakes, and so renders them accessible for the coloring of plastics, which was hitherto impossible owing to their dust explosion hazardousness and/or fire hazardousness on account of the presence therein of combustible organic solvents. Finally, in particular, it also protects pigments that cannot be subjected to mechanical stress in the course of incorporation into the application medium.

It may occasionally be of advantage if, during the preparation of the pigment formulations of the invention, a dispersant (C) is present that is incorporated into the polymer shell. This is the case, for example, when particularly transparent colorations are to be obtained or pigments which are particularly difficult to disperse, such as carbon black, are to be incorporated into the plastic. A further, unexpected, advantageous effect is that the viscosity of the pigment dispersion in the dissolved plastic is greatly lowered when a dispersant (C) is present and hence also the dispersing energy is reduced.

Particularly suitable dispersants (C) include polymeric compounds obtainable by reacting (co)polymers of $C_1$-$C_{25}$ alkyl esters of $\alpha,\beta$-unsaturated carboxylic acids having a terminal hydroxyl group with polyfunctional isocyanates and further reacting the resultant products with ammonia or polyfunctional amines.

The (co)polymers are preferably polyalkyl (meth)acrylates, with particular preference being given to poly-$C_1$-$C_8$ alkyl (meth)acrylates and very particular preference to polymethyl methacrylate and polybutyl methacrylate, especially copolymers of methyl acrylate and butyl methacrylate. The molecular weight of these (co)polymers is generally from 200 to 50,000, preferably from 1000 to 10,000 g/mol.

In order to introduce the terminal hydroxyl group the (co)polymers may be reacted with initiators which decompose to give a hydroxyl radical, examples being hydroperoxides such as tetrahydrofuran hydroperoxide, or regulators containing a hydroxyl function, e.g., thioalcohols such as 2-hydroxyethanethiol.

Polyfunctional isocyanates used are preferably blends of aliphatic polyisocyanates having an average functionality of from 3 to 6, preferably from 3.5 to 5, isocyanate groups per mole. The amount of isocyanate is preferably chosen so that from 1.2 to 3, in particular from 1.5 to 2.5, isocyanate groups react per hydroxyl group of the (co)polymer, the remaining isocyanate groups being converted into urea groups by reaction with amines.

Examples that may be given of particularly suitable isocyanate blends are blends of from 0.1 to 10% by weight, in particular from 0.3 to 8% by weight of a diisocyanate (e.g., hexamethylene diisocyanate), from 30 to 80% by weight, in particular from 42 to 79% by weight, of a triisocyanate (e.g., trifunctional biuret of hexamethylene diisocyanate), and from 20 to 60% by weight, in particular from 22 to 50% by weight, if an isocyanate having a functionality of from 4 to 10 (e.g., a corresponding polyfunctional biuret of hexamethylene diisocyanate).

Suitable polyfunctional amines are, for example, polyfunctional alkylamines and alkyleneamines such as propylamine, butylamine, ethylenediamine, diethylenetriamine, triethylenetetramine, and higher polyethyleneamines and polyethyleneimines and also, preferably, N,N'-bis(aminopropyl)ethylenediamine.

The polyurethane urea (meth)acrylates preferred as dispersants (C) normally have an average molecular weight $M_w$ of from 1000 to 15,000 g/mol, preferably from 8000 t 14,000 g/mol.

These polyurethane urea (meth)acrylates and their preparation are described in DE-A-44 46 383.

Where a dispersant (C) is employed, preferred amounts are from 1 to 20% by weight, based on the total amounts of the pigments (A).

The pigment formulations of the invention accordingly include in general from 0.1 to 40% by weight, in particular from 1 to 10% by weight, of component (A), from 60 to 99.9% by weight, in particular from 90 to 99% by weight, of component (B), and from 0 to 8% by weight, in particular from 0 to 2% by weight, of component (C).

The key to the advantageous performance properties of the pigment formulations of the invention is the uniform envelopment of the pigment particles (A) with the polymer (B) achieved by preparation in accordance with the invention by way of step a), in which the pigments (A) are dispersed homogeneously in a simple manner in a solution of the polymer (B) in an organic solvent in the presence or absence of a dispersant (C), and the granulating step b), in which this homogeneous distribution is converted into the solid state with removal of the solvent.

Suitable solvents for the preparation process of the invention include all those in which the polymer (B) is soluble and which evaporate under the drying conditions with sufficient rapidity that the granules produced do not stick together. Thus, in the case of polymethyl methacrylate, for example, solvents having a boiling point below 80° C. are preferred.

By way of example, mention may be made of the following appropriate solvent classes: aliphatic and alicyclic ketones, ethers, aliphatic alcohols, aliphatic carboxylates, lactones, aromatic hydrocarbons and halogenated derivatives of these solvents and also chlorinated aliphatic hydrocarbons. Specific preferred examples include acetone, hexafluoroacetone, isobutanol, hexafluoro-2-propanol, ethyl acetate, N-methylpyrrolidone, toluene, xylene, methylene chloride, and chloroform. Acetone is particularly preferred. Of course, blends of solvents may also be used.

The amount of solvent is not critical per se; however, appropriately, the amount of solvent used will be not more than that needed to fully dissolve the polymer (B) and to establish a viscosity suitable for the dispersing operation, in order to minimize the effort involved in removing the solvent in step b).

In terms of the process, an appropriate procedure in step a) of the process of the invention for preparing the pigment formulations of the invention, aligned to the stability of the pigments (A) with respect to mechanical stress, is as follows: where the pigments (A) have the ability to withstand mechanical stresses and are intended to produce a transparent coloration, the pigments (A), polymer (B) in granule or powder form, a dispersant (C) if desired, in solution or as a solid, and solvents are mixed with one another and this blend is subjected to grinding using high shear forces, in the course of which the polymer (B) dissolves in the solvent at the same time. It is also possible first to prepare a solution of the polymer (B) and then to disperse the pigments (A) therein. It is also possible first to disperse the pigments (A) in the solution of only a portion of the polymer (B) and then to dilute the resulting dispersion with further polymer solution. Grinding can be carried out in a stirred ball mill using grinding media, e.g., glass or zirconium oxide beads, having a diameter of generally from 1 to 4 mm. For the laboratory scale, a Skandex shaker machine is also suitable, for example, as dispersing equipment.

In the case of pigments (A) which do not have such an ability to withstand mechanical stresses, e.g., in the case of the luster pigments, it is appropriate to choose a more gentle mode of dispersion, an example being stirred incorporation into the solution of the polymer (B) using a stirrer, e.g., a paddle stirrer or bar stirrer. For the laboratory scale, dispersion in a closed vessel on a roller bed at a relatively low rotary speed is also suitable, during which the abovementioned grinding media may be present.

These two procedures may advantageously be combined with one another if the intention is to prepare pigment formulations of the invention comprising color pigments and luster pigments, by first incorporating the color pigments intensively into the solution of the polymer (B) and then dispersing the luster pigments gently in the dispersion of the color pigments in the dissolved polymer (B).

In general, the pigment formulations of the invention may be prepared without problems by such a stagewise approach, by dispersing the pigments (A) as a function of their mechanical stability, in succession if desired, in the polymer solution.

The granulation performed in step b) may be carried out in accordance with conventional methods. By way of example, the following particularly suitable methods are mentioned:

Droplet granulation: in this method, perforated dies are used to produce dispersion droplets, from which the solvent is removed by evaporation in the course of free fall in a heated gas stream.

Belt or roll granulation: the dispersion is applied dropwise to a heated steel belt or steel roller, in the course of which the solvent evaporates.

Spray drying: the dispersion is sprayed through a nozzle into a countercurrent heated gas stream.

Fluidized bed drying: the dispersion is sprayed, again through a nozzle, into a heated fluidized bed.

The size and shape of the granules obtained are determined substantially by the chosen granulating method. For instance, belt and roller granulation generally produce lenticular granules, whereas in the case of spray drying and fluidized bed drying it is predominantly spherical granules which result, having particles sizes up to 0.2 mm or particles size of from about 1 to 6 mm.

In one preferred embodiment of the present invention, granule formation in step b) takes place in the presence of granules of a thermoplastic polymer (B') which may correspond to or be different from the dissolved polymer (B) present in the pigment dispersion, subject to the proviso that the polymers are compatible. In principle, suitable polymers (B') are the thermoplastic polymers already mentioned.

The dispersion produced in step a) is applied as a film to these carrier granules (B'), the ratio of carrier to dispersion being set preferably so that, after drying, film thicknesses of generally from 0.01 to 2 mm, in particular from 0.1 to 0.5 mm, are present and the pigments (A), accordingly, account for generally from 0.1 to 40% by weight, preferably from 1 to 10% by weight, of the resulting pigment formulation.

In the course of this procedure for coloring plastic, the form of the pigment granules produced may be adapted without problems to the form of the polymer granules used as starting material, which usually have particle sizes of from 1 to 10 mm, preferably from 2 to 5 mm.

Different apparatus may be used to prepare these pigment granules.

The pigment dispersion, for example, may be contacted with the polymer carrier (B') in a heatable mixing unit and the solvent removed by heating of the unit.

The coating of the carrier may be performed in a particularly advantageous way in a fluidized bed dryer, in which case it is appropriate to proceed as follows:

The polymer carrier (B') is fluidized with a fluidizing gas heated to a temperature below the sticking point of the polymer and above the evaporation temperature of the solvent, an example of such a fluidizing gas being air, and the pigment dispersion is sprayed into the fluidized bed through one or more nozzles, especially dual-fluid nozzles. Spraying may take place continuously or discontinuously, from below, from above, or from the side. In the course of this process the pigment dispersion is deposited completely on the surface of the carrier granules, giving a very firmly adhering coating which does not exhibit any abrasion.

The pigment formulations of the invention are outstandingly suitable for coloring plastics. Since they are easy to distribute within the polymer melts, it is possible to forego methods of incorporation which stress the pigments and/or else the plastic.

In the case of the particularly preferred pigment granules comprising polymer granules (B') coated with pigments (A) dispersed in the polymer (B), homogeneous distribution of the pigments in the melted plastic is further facilitated, since in each case there is only a thin pigmented plastic layer surrounded on both sides by melting plastic (on the inside, by the carrier plastic; on the outside, by the plastic that is to be colored).

Since with the aid of the pigment formulations of the invention all kinds of pigments may be incorporated advantageously into plastics, a very wide variety of colorations is also possible without problems.

For instance, glass-clear plastics, such as polymethyl methacrylate, polystyrene, polyethylene terephthalate, polycarbonate, and polyurethane may be colored with high transparency and at the same time with very strong coloring using combinations of transparent pigments, including hard-to-disperse pigments, such as transparent iron oxide pigments, carbon black pigments, and perylene pigments.

The special coloristic properties of luster pigments as well, such as brilliance, color and light/dark flops, and deep-seated sheen satin, as are known from coatings, may be reproduced without problems by incorporating the pigment formulations of the invention into plastics and may be modified advantageously by a combination with transparent chromatic and black pigments.

Advantageously, furthermore, the pigment formulations of the invention permit controlled setting of shade by way of a mixer system comprising the dispersions of in each case one pigment (A) in one solution of the polymer (B) as individual mixing components. The desired shade is first of all determined by colorimetry, then the dispersions of the pigments required to establish this shade are mixed in the corresponding amounts and processed to give a pigment formulation of the invention which produces this shade when incorporated into the application medium.

Using the pigment formulations of the invention it is possible to color plastics for all conceivable fields of application, in the form for example of sheets, films, profiles, shaped parts, injection moldings, and fibers.

Preferably, the polymer molding compounds colored with the pigment formulations of the invention are based on acrylic resins, styrene polymers, polycarbonates, polyesters, polyamides, polyether sulfones, polysulfones, polyvinyl chloride, polyether imides, polyether ketones, polyphenylene sulfides, polyphenylene ethers, or blends thereof, each of which may contain additives if desired.

Particular importance is possessed by the incorporation of the Pigment formulations of the invention into the coloring layer of composite sheets, which produce the desired shaped articles by thermoforming, and of composite films, from which the desired shaped parts may be formed by embossing, injection-molding, casting or foaming onto the back of said films, or which may be used to laminate shaped parts.

The composite films, which are likewise of the invention, may constitute three-layer or two-layer systems.

The composite films of the invention (frequently also referred to as injection-backmolded films) accordingly comprise substantially in this order:

(1) at least one substrate layer (1) comprising ASA polymers, ABS polymers, polycarbonates, polyesters, polyamides, polyether imides, polyether ketones, polyphenylene sulfides, polyphenylene ethers or blends thereof, colored if desired with the pigment formulations of the invention, (2) at least one coloring interlayer (2) comprising polymer molding compounds of acrylic resins, styrene polymers, polycarbonates, polyesters, polyamides, polyether sulfones, polysulfones, polyvinyl chloride, polyurethanes or blends thereof, colored with the pigment formulations of the invention, and (3) at least one translucent or transparent top layer (3) comprising poly(meth)acrylates, high-impact poly(meth)acrylates, fluorine (co)polymers, ABS polymers, polycarbonates, polyethylene terephthalate, SAN copolymers or blends thereof, or (1) at least one coloring substrate layer (1') comprising ASA polymers, ABS polymers, polycarbonates, polyesters, polyamides, polyether imides, polyether ketones, polyphenylene sulfides, polyphenylene ethers or blends thereof, colored with the pigment formulations of the invention, and (3) at least one translucent or transparent top layer (3) comprising poly(meth)acrylates, high-impact poly(meth)acrylates, fluorine (co)polymers, ABS polymers, polycarbonates, polyethylene terephthalate, SAN copolymers or blends thereof.

For the substrate layers (1) and/or (1') it is preferred to use ASA polymers. ASA polymers are, generally speaking, impact modified styrene-acrylonitrile polymers in which graft copolymers of vinylaromatic compounds, especially styrene, and vinyl cyanides, especially acrylonitrile, are present on polyalkyl acrylate rubbers (component X) in a copolymer matrix of, in particular, styrene and acrylonitrile (component Y). In another preferred embodiment, use is made of blends of ASA polymers and polycarbonates.

Particularly suitable ASA polymers are composed of a graft copolymer (component X) of (x1) from 1 to 99% by weight, preferably from 55 to 80% by weight, in particular from 55 to 65% by weight, of a particulate graft base (X1) having a glass transition temperature of below 0° C., preferably less than −20° C., with particular preference less than −30° C., (x2) from 1 to 99% by weight, preferably 20 to 45% by weight, in particular from 35 to 45% by weight, of a graft (X2) of the monomers, based on (X2), (x21) from 40 to 100% by weight, preferably 65 to 85% by weight, of units of styrene, of substituted styrene or a (meth)acrylic ester, or blends thereof, especially of styrene and/or α-methylstyrene, as component (X21), and (x22) up to 60% by weight, preferably from 15 to 35% by weight, of units of acrylonitrile or methacrylonitrile, especially of acrylonitrile, as component (X22).

Component (X1) consists substantially of the following monomers:

(x11) from 80 to 99.99% by weight, preferably from 95 to 99.9% by weight, of at least one $C_1$-C8 alkyl ester of acrylic acid, preferably n-butyl acrylate and/or ethylhexyl acrylate, as component (X11), (x12) from 0.01 to 20% by weight, preferably from 0.1 to 5.0% by weight, of at least one polyfunctional crosslinking monomer, preferably diallyl phthalate and/or dicyclopentadienyl acrylate (DCPA), as component (X12).

The acrylate rubbers (X1) preferably comprise alkyl acrylate rubbers composed of one or more $C_1$-$C_8$ alkyl acrylates, preferably $C_4$-$C_8$ alkyl acrylates, preference being given to the use at least in part of butyl, hexyl, octyl and/or 2-ethylhexyl acrylate, especially n-butyl and/or 2-ethylhexyl acrylate.

These acrylate rubbers (X1) contain preferably from 0.01 to 20% by weight, more preferably from 0.1 to 5% by weight, based on the total weight of X1, of bifunctional or polyfunctional monomers having a crosslinking action (crosslinking monomers). Examples of these are monomers containing two or more double bonds capable of copolymerization, preferably not conjugated in positions 1 and 3. Examples of suitable crosslinking monomers are divinylbenzene, diallyl maleate, diallyl fumarate, diallyl phthalate, diethyl phthalate, triallyl cyanurate, triallyl isocyanurate, tricyclodecenyl acrylate, dihydrodicyclopentadienyl acrylate, triallyl phosphate, allyl acrylate, and allyl methacrylate. Dihydrodicyclopentadienyl acrylate (DCPA) has been found (cf. DE-C-1 260 135) to be a particularly advantageous crosslinking monomer.

Into the alkyl acrylate rubbers (X1) it is also possible to incorporate, by copolymerization, up to 30% by weight, based on the total weight of (X1), of monomers which form "hard" polymers, such as vinyl acetate, (meth)acrylonitrile, styrene, substituted styrene, methyl methacrylate and/or vinyl ethers.

In one embodiment of the invention, the graft base (X1) used comprises crosslinked acrylic ester polymers having a glass transition temperature below 0° C. The crosslinked acrylic ester polymers should preferably possess a glass transition temperature below −20° C., in particular below −30° C.

In one preferred embodiment, the graft base (X1) is composed of from 15 to 99.9% by weight, in particular from 70 to 99.9% by weight, of $C_1$-$C_8$ alkyl esters of acrylic acid, from 0.1 to 5% by weight, in particular from 0.1 to 3% by weight, of crosslinkers, and from 0 to 49.9% by weight, in particular from 0 to 20% by weight, of one of the further rubbers or monomers indicated.

Suitable monomers for forming the graft (X2) as component (X21) are, for example, styrene, substituted styrenes such as mono- or polysubstituted alkylstyrenes and/or halostyrenes, e.g., α-methylstyrene, and (meth)acrylic esters such as methyl methacrylate, 2-ethylhexyl acrylate, and n-butyl acrylate, especially methyl methacrylate. Particularly suitable components (X22) include acrylonitrile and methacrylonitrile, especially acrylonitrile.

The component (X) preferably comprises graft copolymers. The graft copolymers (X) generally have an average particle size $d_{50}$ of from 50 to 1000 nm, preferably from 50 to 800 nm, and with particular preference from 50 to 600 nm. Preferred particle sizes of the graft base (X1) are in the range from 50 to 350 nm, preferably from 50 to 300 nm, and with particular preference from 50 to 250 nm.

The graft copolymer (X) may be of single-stage or multistage construction, i.e., the graft core is surrounded by one or more graft shells. Two or more graft shells are generally applied to the rubber particles by stepwise grafting, it being possible for each graft shell to have a different composition. In addition to the grafting monomers, it is possible to graft on polyfunctional, crosslinking monomers or monomers containing reactive groups (see also EP-A-230 282, DE-AS-36 01 419, and EP-A-269 861).

In one preferred embodiment the component (X) comprises a graft copolymer of multistage construction, the graft stages having been prepared in general from resin-forming monomers and having a glass transition temperature $T_g$ of above 30° C., preferably of above 50° C. One of the purposes of the multistage construction is to achieve (partial) compatibility of the rubber particles (X) with the component (Y).

In another preferred embodiment of the invention, the particle size distribution of component (X) is bimodal, with in general from 60 to 90% by weight having an average particle size of from 50 to 200 nm and from 10 to 40% by weight having an average particle size of from 50 to 400 nm, the weight percentages being based on the total weight of component (X).

The stated parameters of average particle size and particle size distribution are those determined from the integral mass distribution. In all cases, the average particle sizes according to the invention relate to the weight average particle sizes as determined by means of an analytical ultracentrifuge in accordance with the method of W. Scholtan and H. Lange, Kolloid-Z. und Z. Polymere 250 (1972), pages 782-796. The ultracentrifuge measurement yields the integral mass distribution of the particle diameter of a sample. From this it is possible to derive the percentage by weight of the particles having a diameter equal to or smaller than a certain size. The average particle diameter, which is also termed the $d_{50}$ of the integral mass distribution, is defined as the particle diameter for which 50% by weight of the particles have a smaller diameter than the diameter corresponding to the $d_{50}$. Similarly, at the same time 50% by weight of the particles have a larger diameter than the $d_{50}$. The breadth of the particle size distribution of the rubber particles is characterized using not only the $d_{50}$ (average particle diameter) but also the $d_{10}$ and $d_{90}$ figures resulting from the integral mass distribution. In accordance with the $d_{50}$, the $d_{10}$ and $d_{90}$ figures of the integral mass distribution have the same definition except that they relate to 10 and, respectively, 90% by weight of the particles. The ratio $Q=(d_{90}-d_{10})/d_{50}$ — is a measure of the breadth of distribution of the particle size. The smaller the value of Q, the narrower the distribution.

Graft copolymers (X) can be prepared by emulsion, solution, bulk or suspension polymerization. Preference is given to free-radical emulsion polymerization, where the monomers (X21) and (X22) are grafted on in the presence of latices of component (X1) at temperatures up to 90° C. using water-soluble or oil-soluble initiators such as peroxodisulfate or benzyl peroxide or with the aid of redox initiators. Redox initiators may also be used for polymerizations below 20° C.

Suitable emulsion polymerization processes are, for example, described in DE-A-28 26 925, DE-A-31 49 358 and DE-C-1 260 135.

The graft shell construction by means of emulsion polymerization is also described in DE-A-32 27 555, DE-A-31 49 357, DE-A-31 49 358, and DE-A-34 14 118. The particle size of component (X) may preferably be adjusted, in particular to values in the range from 50 to 1000 nm, by the techniques disclosed in DE-C-1 260 135, DE-A-28 26 925 and Applied Polymer Science Volume 9 (1965), page 2929. Polymers having different particle size distributions are preparable, for example, in accordance with DE-A-28 26 925 and U.S. Pat. No. 5,196,480.

For example, in accordance with the process described in DE-C-1 260 135, the graft base (X1) may be obtained first of all by polymerizing $C_1$-$C_8$ alkyl esters of acrylic acid and crosslinking monomers, alone or together with further comonomers, in a conventional manner in aqueous emulsion at temperatures from 20 to 100° C., preferably from 50 to 80° C. The customary emulsifiers, such as alkali metal salts of alkyl- or alkylarylsulfonic acids, alkyl sulfates, fatty alcohol sulfonates, salts of higher fatty acids having from 10 to 30 carbon atoms or resin soaps, may be used. It is preferred to use sodium salts of alkylsulfonates or fatty acids having from 10 to 18 carbon atoms. In one embodiment the emulsifiers are added in amounts of from 0.5 to 5% by weight, in particular from 1 to 2% by weight, based on the monomers used in the preparation of the graft base (X1). In general, a weight ratio of water to monomers of from 2:1 to 0.7:1 is used. Polymerization initiators employed include in particular the customary persulfates, an example being potassium persulfate. It is, however, also possible to employ redox systems. The initiators are generally added in amounts of 0.1 to 1% by weight, based on the monomers used in the preparation of the graft base (X1). As further polymerization auxiliaries it is possible to make use of customary buffer substances, such as sodium bicarbonate or sodium pyrophosphate, by means of which a pH of preferably from 6 to 9 is established, and also from 0 to 3% by weight of a molecular weight regulator, such as mercaptans, terpinols or dimeric α-methylstyrene.

In one embodiment of the invention, the resulting latex of crosslinked acrylic ester polymer is grafted with a monomer blend comprising a vinylaromatic compound (component, (X21)), e.g., styrene, and a vinyl cyanide (component (X22)), e.g., acrylonitrile, the weight ratio of, for example, styrene to acrylonitrile in the monomer blend being in the range from 100:0 to 40:60, preferably in the range from 65:35 to 85:15. Advantageously, this graft copolymerization is again carried out in aqueous emulsion under the customary conditions described above. The graft copolymerization may appropriately take place in the same system as the emulsion polymerization for preparing the graft base (X1), with the addition where necessary of further emulsifier and/or initiator. The monomer blend of styrene and acrylonitrile may be added to the reaction blend in one go, in a number of steps or, preferably, continuously during the polymerization. The graft copolymerization of this blend in the presence of the crosslinked acrylic ester polymer is preferably conducted so as to result in a degree of grafting of from 1 to 99% by weight, preferably from 20 to 45% by weight, in particular from 35 to 45% by weight, based on the total weight of component (X), in the graft copolymer (X). Since the grafting yield in the graft copolymerization is generally not 100%, it is common to use a somewhat larger amount of the monomer blend of styrene and acrylonitrile during the graft copolymerization than the amount corresponding to the desired degree of grafting. The control of the grafting yield during the graft copolymerization and thus of the degree of grafting of the finished graft copolymer (X) is familiar to the skilled worker and may take place, for example, inter alia, by way of the rate of addition of the monomers or by the addition of regulator (Chauvel, Daniel, ACS Polymer Preprints 15 (1974), page 329 ff.). The emulsion graft copolymerization generally produces from about 5 to 15% by weight, based on the graft copolymer (X), of free, i.e., ungrafted styrene/acrylonitrile copolymer. The fraction of the graft copolymer (X) in the polymerization product obtained during the graft copolymerization is determined in accordance with the method indicated above.

The preparation of the graft copolymers (X) by the emulsion process not only has the technical advantages indicated but also provides the possibility of reproducible particle size alterations, by means for example of at least partial agglomeration of the particles to form larger particles. This means that the graft copolymers (X) may include polymers having different particle sizes.

Component (Y) is a copolymer containing substantially
(y1) from 40 to 100% by weight, preferably from 60 to 85% by weight, of units of styrene, substituted styrene or of a (meth)acrylic ester or blends thereof, in particular of styrene and/or α-methylstyrene as component (Y1),
(y2) up to 60% by weight, preferably from 15 to 40% by weight, of units of acrylonitrile or methacrylonitrile, in particular of acrylonitrile as component (Y2).

In one preferred embodiment of the invention, the viscosity number of component (Y) is from 50 to 90, preferably from 60 to 80, determined in accordaance with DIN 53 726 on a 0.5% strength by weight solution in dimethylformamide.

Component (Y) is preferably an amorphous polymer as described, for example, above as graft (X2). In one embodiment of the invention, the component (Y) used comprises a copolymer of styrene and/or α-methylstyrene with acrylonitrile. The acrylonitrile content of these copolymers of component (Y) is generally from 0 to 60% by weight, preferably from 15 to 40% by weight, based on the total weight of component B. Also included in component (Y) are the free, ungrafted copolymers of vinylaromatic compounds and vinyl cyanides, e.g., styrene/acrylonitrile copolymers, which are formed in the course of the graft copolymerization to prepare the component (X). Depending on the conditions chosen for the graft copolymerization for preparing the graft copolymer (X), it may be possible that a sufficient fraction of component (Y) has already been formed during the graft copolymerization. In general, however, it is necessary to blend the products obtained during the graft copolymerization with additional, separately prepared component (Y). The components (X2) and (Y) need not of course be identical in terms of their composition.

Said additional, separately prepared component (Y) preferably comprises a styrene/acrylonitrile copolymer, an α-methylstyrene/acrylonitrile copolymer or an α-methylstyrene/styrene/acrylonitrile terpolymer. These copolymers may be used individually or else as a blend for component (Y), so that said additional, separately prepared component (Y) may comprise, for example, a blend of a styrene/acrylonitrile copolymer and an α-methylstyrene/acrylonitrile copolymer. Where component (Y) comprises a blend of a styrene/acrylonitrile copolymer and an α-methylstyrene/acrylonitrile copolymer, the acrylonitrile contents of the two copolymers should differ from one another preferably by not more than 10% by weight, preferably not more than 5% by weight, based on the total weight of the copolymer. Alternatively, component (Y) may consist only of a single copolymer of vinylaromatic compounds and vinyl cyanides if the starting monomer blend for the graft copolymerizations to prepare the component (X) was the same as that used for the preparation of the additional, separately prepared component (Y).

The additional, separately prepared component (Y) may be obtained by the conventional techniques. Thus, in accordance with one embodiment of the invention, the copolymerization of, for example, styrene and/or α-methylstyrene with acrylonitrile may be carried out in bulk, solution, suspension or aqueous emulsion.

In one preferred embodiment, the substrate layer (1) or (1') comprises not only components X and Y but also polycarbonates as an additional component (component Z) and also, if desired, further additives, as described below.

Suitable polycarbonates, including copolycarbonates, have already been described above.

The addition of polycarbonates leads among other things to higher thermal stability and enhanced crack resistance of the composite sheets.

The mixing of components (X) and (Y) and also, where appropriate, (Z) may take place in any desired way by any known method. If, for example, components (X) and (Y) have been prepared by emulsion polymerization, it is possible to mix the resulting polymer dispersions with one another, then to coprecipitate the polymers, and to work up the polymer blend. Preferably, however, components (X) and (Y) are blended by conjoint extrusion, kneading or roller treatment of the components, preferably at temperatures in the range from 180 to 400° C., the components having been isolated beforehand where necessary from the solution or aqueous dispersion obtained in the polymerization. The graft copolymerization products (component X) obtained in aqueous dispersion may also be only partly dewatered and mixed as wet crumb with component (Y), with the full drying of the graft copolymers then taking place in the course of mixing.

It may be advantageous to premix certain components. The mixing of the components in solution and removal of the solvents is also possible. Organic solvents are preferred, examples being chlorobenzene, blends of chlorobenzene and methylene chloride, or blends of chlorobenzene and aromatic hydrocarbons, e.g., toluene. The evaporation of the solvent blends may take place, for example, in evaporative extruders. The components may be metered in not only together but also separately and, where appropriate, in succession.

The substrate layer (1) or (1') comprising components (X), (Y) and, where appropriate, (Z) may further comprise, as further additives, those compounds typical of and customary for the above-described (co)polymers such as polycarbonates, SAN polymers or ASA polymers and also blends thereof. Examples of additives that may be mentioned include the following: antistats, antioxidants, optical brighteners, heat stabilizers, light stabilizers, stabilizers for raising the hydrolysis resistance and chemical resistance, agents to counteract thermal decomposition, and especially the lubricants/release agents that are appropriate for the production of shaped parts. The addition of these further additives may take place at any stage of the production process, but preferably at an early point in time, in order to exploit the stabilizing effects (or other special effects) of the additive at an early stage.

Suitable heat stabilizers or oxidation retardants are commonly metal halides (chlorides, bromides, iodides) derived from metals of group I of the Periodic Table of the Elements (such as Li, Na, and K).

Particularly suitable stabilizers are the customary hindered phenols, e.g., 2,6-disubstituted phenols such as 2,6-di-tert-butyl-4-methylphenol (BHT), 4-methoxymethyl-2,6-di-tert-butylphenol, 2,6-di-tert-butyl-4-hydroxymethylphenol, 2,2-bis(4-hydroxyphenyl)propane, 4,4'-dihydroxybiphenyl, and 2,6-di-methyl-4-methylphenol, preference being given to 2,6-bis($C_1$-$C_{10}$ alkyl)-4-($C_1$-$C_{10}$ alkyl)phenols. Also suitable are vitamin E and compounds of analogous structure. Additionally suitable, furthermore, are the HALS stabilizers (Hindered Amine Light Stabilizers), such as tetraalkylpiperidine-N-oxy compounds, benzophenones, resorcinols, salicylates and benzotriazoles such as Tinuvin®P (2-(2H-benzotriazol-2-yl)-4-methylphenol). These are used commonly in amounts of up to 2% by weight, based on the total blend.

Examples of suitable mold release agents and lubricants are stearic acids, stearyl alcohol, stearic esters and, generally, higher fatty acids, derivatives thereof, and corresponding fatty acid blends having from 12 to 30 carbon atoms. The amounts of these additions are in the range from 0.05 to 1% by weight, based on the total blend.

Silicone oils, oligomeric isobutylene or similar substances are also suitable as additives. The customary amounts are from 0.05 to 5% by weight, based on the total blend.

Processing aids, e.g., slip agents, and stabilizers, such as UV stabilizers, and also antistats are commonly used together in amounts of from 0.01 to 5% by weight.

Instead of ASA polymers and/or their blends with polycarbonates, or else in addition to these, the substrate layer (1) or (1') may also include ABS polymers (these are, inter alia, impact-modified styrene/acrylonitrile polymers in which graft copolymers of styrene and acrylonitrile on polybutadiene rubbers are present in a copolymer matrix of styrene and acrylonitrile), polyesters such as polybutylene terephthalate (PBT) or polyethylene terephthalate (PET), polyamides, polyether imides (PEI), polyether ketones (PEK), polyphenylene sulfides (PPS), polyphenylene ethers, or blends of these polymers. The aforementioned polymer molding compounds are general knowledge, being known for example from H. Domininghaus, Die Kunststoffe und ihre Eigenschaften, VDI-Verlag, Düsseldorf (1992).

In one preferred embodiment the substrate layer (1) or (1') is formed from a molding compound comprising components (X), (Y) and, where appropriate, (Z), comprising ABS polymers, polycarbonates, polybutylene terephthalates, polyethylene terephthalates, polyamides or blends of the aforementioned molding colmpounds. With particular preference the substrate layer (1) comprises a molding compound comprising components (X), (Y) and, where appropriate, (Z) comprising ABS, polycarbonate and polybutylene terephthalate. It may also consist substantially or completely of these polymers.

The thickness of the substrate layer (1) or (1') is preferably from 100 to 2000 μm, in particular from 150 to 1500 μm, and with particular preference from 200 to 1000 μm.

For the top layer (3) of the composite films it is common to employ poly(meth)acrylate polymers. Particularly suitable for use as top layer material are polymethyl methacrylates (PMMA), for example as described in EP-A-255 500. PMMA having average molecular weights in the range from 40,000 to 100,000 g/mol is preferred. Suitable PMMA molding compounds are, for example, products available under the brand name Lucryl® (BASF AG).

The top layer (3) is generally translucent, preferably transparent. Instead of poly(meth)acrylate polymers or together with these it is also possible to use high-impact poly(meth)acrylates, especially high-impact polymethyl methacrylate, fluorene (co)polymers, such as polyvinylidene fluoride (PVDF), ABS polymers, polycarbonates, polyethylene terephthalate or SAN copolymers. In particular the top layer contains polymethyl methacrylate, high-impact polymethyl methacrylate or polycarbonates, preferably polymethyl methacrylate, high-impact polymethyl methacrylate, PVDF or blends thereof. The polymers and/or blends thereof are generally chosen such that they lead to a transparent top layer.

Suitable fluorine (co)polymers are formed from olefinically unsaturated monomers or comonomers, respectively, in which at least one $sp^2$ carbon atom is linked covalently to at least one fluorine atom. These (co)monomers include, for example, chlorotrifluoroethene, fluorovinylsulfonic acid, hexafluoroisobutene, hexafluoropropene, perfluorovinyl methyl ether, tetrafluoroethene, vinyl fluoride, and particularly vinylidene fluoride. The weight average molecular weight of the fluorine (co)polymers is usually in the range from 50,000 to 300,000, preferably in the range from 100,000 to 200,000 g/mol. Blends of fluorine (co)polymers and poly(meth)acrylates may also be used. Preference is given to blends of polyvinylidene fluoride (PVDF) and polymethyl methacrylate. The fraction of PVDF in these blends is advantageously in the range from 40 to 80% by weight, preferably from 55 to 75% by weight, based on the total weight of the blend.

Additionally, a tie layer containing or comprising an adhesion promoter, with a layer thickness of from 5 to 400 μm, may adjoin the outer surface of the substrate layer (1). The purpose of the adhesion promoter is to produce a firm bond with a chosen substrate that comes to lie beneath the substrate layer (as a result, for example, of injection backmolding). The tie layer is used when the adhesion of this further substrate to the substrate layer is inadequate (in the case, for example, of polyolefin substrates). Suitable adhesion promoters are known to the skilled worker. Examples of suitable adhesion promoters are ethylene-vinyl acetate copolymers for tying to polyethylene, and maleic anhydride-grafted polypropylenes for tying to polypropylene. In both cases, common opinion suggests that the adhesion is achieved by the incorporation of polar groups into the nonpolar polyolefins.

For the interlayer (2) of the composite film it is preferred to employ polymer molding compounds comprising one or more thermoplastics and/or thermosets, together if desired with further additives and/or additaments, and a pigment formulation of the invention. Suitable thermoplastics include, for example, the polyalkyl and/or polyaryl esters of (meth)acrylic acid, poly(meth)acrylamides or poly(meth)acrylonitrile, also called acrylic resins, and also styrene polymers such as ABS polymers, styrene/acrylonitrile polymers (SAN) or ASA polymers, polycarbonates, polyesters, e.g., polyethylene or polybutylene terephthalate, polyamides, especially amorphous polyamide, e.g., polyamide 12, polyether sulfones, polysulfones or polyvinyl chloride. Blends of the above (co)polymers are also suitable in principle, examples being blends of ASA polymers and polycarbonates as described above for the substrate layer (1). Suitable thermosets include, for example, polyurethanes, i.e., for example, the so-called polyester foams and especially polyether foams. This class of compound is well known to the skilled worker and is described, inter alia, in Kunststoff-Handbuch, Volume 7, Polyurethane, edited by G. Oertel, 2nd ed., Carl Hanser Verlag, Munich, 1983, in particular on pages 170-246. It is preferred to employ acrylic resins and/or styrene polymers.

Suitable acrylic resins, styrene polymers, polycarbonates, polyesters, polyamides, polyether sulfones, polysulfones or vinyl polymers, and also polyurethanes, are described above.

The interlayer (2) is preferably composed of high-impact polymethyl methacryltes (PMMA), polycarbonates, or the ASA polymers described above for the substrate layer (1), or blends thereof with polycarbonates.

The thermoplastics (B) present in the pigment formulations of the invention may but need not be the same as the molding compounds which form the interlayer (2); however, they should be at least partly compatible with said molding compounds, i.e., should not exhibit separation phenomena.

The thickness of the interlayer (2) is generally in the range from 10 to 1000 μm, preferably from 50 to 500 μm, and with particular preference from 100 to 400 μm.

In another embodiment, the substrate layer as well as the interlayer is colored with a pigment formulation of the invention. Furthermore, in a composite system comprising a substrate layer, interlayer and top layer, it is also possible for only the substrate layer to be colored.

Composite films comprising a substrate layer (1), an interlayer (2), a top layer (3) and, if desired, a tie layer (0) normally have the following layer thicknesses:

substrate layer (1): from 100 to 2000 μm, preferably from 150 to 1500 μm, and with particular preference from 200 to 1000 μm;

interlayer (2): from 10 to 1000 μm, preferably from 50 to 500 μm, with particular preference from 70 to 400 μm, and in particular 40 from 100 to 300 μm;

top layer (3): from 20 to 300 μm. preferably from 50 to 200 μm, and with particular preference from 50 to 100 μm; and tie layer (0): from 5 to 400 μm, preferably from 10 to 200 μm, and with particular preference from 50 to 100 μm.

The total thickness of this composite film is usually from 150 to 2000 μm, preferably from 250 to 1500 μm, and with particular preference from 200 to 1000 μm.

Composite films comprising a coloring substrate layer (1'), a top layer (3) and, if desired, a tie layer (0) normally have the following layer thicknesses:

substrate layer (1'): from 100 to 2000 μm, preferably from 150 to 1500 μm, and with particular preference from 200 to 1000 μm;

top layer (3): from 20 to 300 μm, preferably from 50 to 200 μm, and with particular preference from 50 to 100 μm; and tie layer (0): from 5 to 400 μm, preferably from 10 to 200 μm, and with particular preference from 50 to 100 μm.

The total thickness of this composite film is usually from 120 to 2000 μm, preferably from 250 to 1500 μm, and with particular preference from 200 to 1000 μm.

The composite films of the invention may be produced in a single-stage process by coextrusion of the additives and plastics which form the individual layers, with both adapter and die coextrusion techniques being suitable. The components of each layer are homogenized and brought to flowability in a separate extruder and the melt flows are then overlaid on one another in the layer sequence desired for the composite layer system by means of special equipment (in a feedblock, for example) and coextruded through a slot die. Further details are described in EP-A-847 852 and DE-A-

199 28 774, unpublished at the priority date of the present invention, and also the literature cited therein.

Of course, the composite films may also be produced by extruding the individual layers separately and then laminating them together to form a composite film.

The composite films of the invention may be used with advantage to produce the shaped plastic parts, likewise of the invention, by back-embossing, injection backmolding, back-casting or foam-backing said films starting from the substrate layer (1) or (1') or the tie layer (0) with the plastic molding material in accordance with known techniques.

The composite films of the invention may be oriented or preformed y thermoforming, in which case the positive and negative thermoforming techniques known to the skilled worker may be used. Since the gloss and/or surface quality of the composite films of the invention does not decrease with orientation at high draw ratios, of up to 1:5, for example, the thermoforming techniques are subject to virtually no practically relevant restrictions in respect of the orientation possible.

The production of injection backmolded shaped plastic parts thus preferably comprises the following steps:
a1) producing the composite film by means of adapter or die coextrusion of substrate layer, interlayer where appropriate, and top layer in a single-stage process, or
a2) producing the individual films by extrusion or calendering and then laminating them to give the composite film,
b) if desired, thermoforming the composite film obtained in step a) in a mold, and
c) injection-backmolding the composite film with a preferably fiber-reinforced plastic material.

Preferred plastic materials in this context are thermopolymer molding compounds based on ASA or ABS polymers, SAN polymers, polyether sulfones, polybutylene terephthalate, polypropylene (PP) or polyethylene (PE) and also blends of ASA polymers with polycarbonates or of ASA polymers with polybutylene terephthalate and also blends of polycarbonates with polybutylene terephthalate, it being appropriate when using PE and/or PP to provide the substrate layer (1) with a tie layer (0) beforehand. Amorphous thermoplastics and/or blends thereof are particularly preferred. ABS polymers are very particularly preferred.

Owing to its damping properties, fiber reinforced polyurethane (semirigid foam systems) is another suitable plastic material.

The plastic materials preferably contain fibers in an amount of from 5 to 30% by weight, more preferably from 7 to 25% by weight, in particular from 10 to 20% by weight. Fibers employed include natural fibers such as flax, hemp, jute, sisal, ramie or carnaf. Carbon fibers and glass fibers are preferred.

The glass fibers used may be of E, A or C glass and have preferably been treated with a size and a coupling agent. Their diameter is generally from 6 to 20 μm. Both continuous fibers (rovings) and cut glass fibers (staple) with a length of from 1 to 15 mm, preferably from 5 to 10 mm, may be used. Suitable sizes are composed, for example, of unsaturated polyester resins, are otherwise known to the skilled worker, and may also be obtained commercially (e.g., Cratec® (OCF)).

The shaped plastic parts of the invention may be employed in the automotive sector, in particular as interior and/or exterior automotive bodywork parts, e.g., as relatively small exterior automotive bodywork parts, such as mirrors or trim strips, or as exterior bodywork parts of large surface area, such as wings, hoods, covers, spoilers, doors, fenders or bumpers, and additionally may be used as domestic and electrical appliance casings, as battery supports, facade panels, floor coverings, mobile-telephone casings, or seat shells.

The composite films of the invention and the shaped plastic parts obtained from them by injection backmolding, back-embossing, foam-backing or back-casting are notable for a very high degree of deep-seated satin sheen. Especially in the weathering test, in respect of weathering stability and consistency of color, they are superior to conventionally colored plastic composite systems and at least equal to conventional metal finishes. Moreover, the color of these shaped parts may readily be harmonized with the color of painted metal surfaces, thereby enabling such parts to be used in line production.

EXAMPLES

A) Preparation of Inventive Pigment Formulations

Example 1

A blend of 60 g of a commercial polymethyl methacrylate (Lucryl KR 2006/1, BASF), 30 g of the color pigment C.I. Pigment Blue 15:4 (average particle diameter from 0.05 to 0.2 μm), 180 g of acetone and 550 g of zirconium dioxide beads (SAZ, diameter from 1 to 1.6 mm) was shaken in a sealed 500 ml glass vessel in a Skandex shaker machine for 4 h.

The resulting color pigment dispersion had the grinding media separated from it and was then introduced into a solution, stirred with a paddle stirrer, of 240 g of the same PMMA in 1 l of acetone. Thereafter, 70 g of a luster pigment based on $SiO_2$- and $Fe_2O_3$-coated aluminum flakes (average particle diameter ($D_{50}$) 17 μm; Variocrom Magic Gold L 1400; BASF) were added and dispersed gently at low speed into the color pigment dispersion in about 15 minutes.

The resulting pigment dispersion was subsequently applied via nozzles to 1.6 kg of PMMA extrusion granules (length about 3 mm, thickness from 1 to 3 mm, average weight per granular particle 0.015 g) fluidized with 70 m³/h air heated to 70° C. in a fluidized-bed dryer (diameter of the fluidizing base 150 mm, cylindrical height 500 mm) over 2 h (0.7 kg/h).

This gave 1997 g of a pigment formulation in PMMA having a luster pigment content of 3.5% by weight and a color pigment content of 1.5% by weight, in the form of free-flowing, abrasion resistant granules having a diameter of from 2 to 4 mm.

Example 2

The procedure of Example 1 was repeated but using, as the color pigment, 30 g of C.I. Pigment Red 179 (average particle diameter from 0.01 to 0.1 μm) and, as the luster pigment, 70 g of aluminum flakes (average particle diameter from 10 to 12 μm; Stapa Hydrolux® 2192; Eckart).

This gave 1993 g of a pigment formulation in PMMA having a luster pigment content of 3.5% by weight and a color pigment content of 1.5% by weight in the form of free-flowing, abrasion resistant granules having a diameter of from 2 to 4 mm.

Example 3

The procedure of Example 1 was repeated but using 70 g of aluminum flakes from Example 2 as the luster pigment.

This gave 1998 g of a pigment formulation in PMMA having a luster pigment content of 3.5% by weight and a color pigment content of 1.5% by weight in the form of free-flowing, abrasion resistant granules having a diameter of from 2 to 4 mm.

Example 4

The procedure of Example 1 was repeated but using, as the color pigment, 30 g of C.I. Pigment Blue 60 (average particle diameter of from 0.1 to 0.5 µm) and, as the luster pigment, 70 g of $TiO_2$-coated mica platelets (average particle diameter of from 10 to 60 µm; Iriodin 100 Silberperl; Merck).

This gave 1995 g of a pigment formulation in PMMA having a luster pigment content of 3.5% by weight and a color pigment content of 1.5% by weight, in the form of free-flowing, abrasion resistant granules having a diameter of from 2 to 4 mm.

Example 5

A blend of 120 g of a commercial acrylonitrile-styrene-acrylate copolymer (ASA; Luran S; BASF), 59.9 g of the color pigment C.I. Pigment Red 179 from Example 4, 0.1 g of C.I. Pigment Black (Printex® 60; Degussa), 360 g of acetone and 1.1 kg of zirconium. dioxide beads (SAZ, diameter of from 1 to 1.6 mm) was shaken in a sealed 1 l glass vessel in a Skandex shaker machine for 4 h.

The resulting color pigment dispersion had the grinding media removed from it and was then introduced into a solution, stirred with a paddle stirrer, of 180 g of the same ASA copolymer in 800 g of acetone. Thereafter, 40 g of the luster pigment based on $TiO_2$-coated mica platelets from example 4 were added and were dispersed gently at a low speed into the color pigment dispersion in about 15 minutes.

The resulting pigment dispersion was then sprayed onto 1.6 kg of the PMMA granules from Example 1 by the method of Example 1.

This gave 1996 g of a pigment formulation having a luster pigment content of 2% by weight and a color pigment content of 3% by weight, in the form of free-flowing, abrasion resistant granules having a diameter of from 2 to 4 mm.

B) Application of Inventive Pigment Formulations

Example 6

Composite films having the following structure were produced:
(1) Substrate layer: 600 µm layer of a commercial acrylonitrile-styrene-acrylate copolymer (ASA; Luran S; BASF)
(2) coloring interlayer: 200 µm layer of a commercial polymethyl methacrylate (PMMA; Lucryl; BASF), pigmented in each case 2% with the pigment formulations from Examples 1 to 3
(3) top layer: 50 µm layer of a commercial polymethyl methacrylate (PMMA; Lucryl; BASF)

The components of the individual layers (1) to (3) were each melted and homogenized in a separate single-screw extruder at from 250 to 260° C. The melt flows were overlaid on one another in a feedblock before entering the slot die, and were stretched in the form of a layer composite to the width of the die (1.2 m).

This gave very bright composite films having very good thermoforming properties. The coloristic impression imparted by these films was comparable with that of corresponding surface coatings. The CIELAB values of hue (color angle in °), C* (Chroma), and L (lightness) of the films colored with the pigment formulations from Examples 1 to 3 were measured using a Multiflash Goniospectrophotometer (from Optronik) at an angle difference of 25°, 45°, 70°, and 110° to the glancing angle, using standard illuminant D65, and are compiled in Table 1.

Example 7

Composite films having the following structure were produced:
(1') pigmented substrate layer: 900 µm layer of the acrylonitrile-styrene-acrylate copolymer from Example 6, pigmented 2% with the pigment formulation from Example 5
(3) top layer: 50 µm layer with a composition the same as that of layer (3) in Example 6

The composite film was produced as in Example 6.

The result was a very bright, cloudless composite film having very good thermoforming properties. The coloristic impression imparted by this film was comparable with that of a corresponding surface coating. In particular, the deep-seated satin sheen ("mica effect") characteristic of a surface coating with luster pigments on a transparent substrate basis was retained unchanged.

For comparison (V), a composite film was produced whose pigmented substrate layer (1') was colored using a concentrate of the pigments used in Example 5, said concentrate having been prepared conventionally by the cold feed method in a twin-screw extruder (again, pigmentation was 2%).

The resultant composite film was weaker in color, paler, and substantially less bright. In particular, owing to the damage to the luster pigment in the course of its incorporation into the plastic, the mica effect was no longer observed.

The CIELAB values of the two composite films were measured as in Example 6 and are likewise compiled in Table 1.

Additionally, the weathering stability of the composite film produced in Example 7 and for comparison, of red-pigmented surface coatings (refinish VL1 and OEM finish VL2) was tested in accordance with ISO 4892-2A. Table 2 gives the results of colorimetry to DIN 53236 (45/0° and diffuse 8°; reported as color deviation total dE, based on the colorimetry before the beginning of weathering) after weathering for 500 h and 1000 h, and also the gloss measurement in accordance with DIN 67530 (20°).

For the diffuse 8° measurement, the composite film exhibited a color difference comparable with that of the surface coatings. When measured at 45/0°, however, the color difference of the composite film was much less. The gloss of the composite film did not change, but the gloss of the surface coatings decreased distinctly.

TABLE 1

| Pigment formulation from Ex. | Hue [°] Measurement angle 25° | C* | L | Hue [°] Measurement angle 45° | C* | L | Hue [°] Measurement angle 70° | C* | L | Hue [°] Measurement angle 110° | C* | L |
|---|---|---|---|---|---|---|---|---|---|---|---|---|
| 1 | 299.8 | 18.9 | 50.4 | 278.3 | 18.3 | 24.0 | 260.4 | 14.1 | 17.7 | 243.2 | 13.3 | 14.5 |
| 2 | 19.5 | 30.3 | 53.3 | 27.8 | 26.2 | 32.6 | 34.6 | 25.7 | 23.7 | 38.8 | 26.8 | 19.9 |
| 3 | 225.6 | 38.9 | 59.6 | 240.4 | 30.0 | 33.3 | 254.2 | 23.1 | 22.7 | 262.0 | 22.5 | 18.3 |
| 5 | 27.2 | 46.8 | 28.4 | 28.5 | 42.4 | 22.3 | 28.7 | 39.4 | 20.1 | 30.1 | 40.5 | 19.8 |
| V | 23.9 | 38.4 | 33.1 | 24.9 | 36.7 | 29.8 | 24.6 | 36.1 | 26.8 | 25.9 | 37.9 | 24.5 |

TABLE 2

|  | Total dE (45/0°) | | Total dE (diff. 8°) | | Gloss | | |
|---|---|---|---|---|---|---|---|
|  | 500 h | 1000 h | 500 h | 1000 h | 0 h | 500 h | 1000 h |
| Film from Ex. 7 | 0.2 | 0.7 | 0.6 | 0.6 | 78 | 78 | 78 |
| VL1 | 2.8 | 2.6 | 0.2 | 0.6 | 72 | 70 | 65 |
| VL2 | 1.9 | 2.4 | 0.7 | 0.8 | 80 | 64 | 66 |

We claim:

1. A pigment formulation in granule form obtainable by
   a) dispersing at least two different pigments (A) in a solution of a thermoplastic polymer (B) in an organic solvent in the presence or absence of a dispersant (C), and
   b) applying as a layer the dispersion produced in step a) to granules of a thermoplastic polymer (B'), which is the same as the polymer (B), with removal of the solvent, wherein
   the pigment formulation comprises
      the granules of the thermoplastic polymer (B'); and
      a coating on the granules of the thermoplastic polymer (B'), where the coating comprises the at least two different pigments (A) and the thermoplastic polymer (B).

2. A pigment formulation as claimed in claim 1, comprising as component (A) at least two pigments from the group consisting of organic and inorganic chromatic, white and black pigments, luster pigments and liquid-crystal pigments.

3. A pigment formulation as claimed in claim 1, comprising as component (A) at least one luster pigment and at least one transparent chromatic or black pigment.

4. A pigment formulation as claimed in claim 1, comprising as component (B) and (B') one or more thermoplastic polymers from the group consisting of acrylic resins, styrene polymers, vinyl polymers, polycarbonates, polyamides, polyesters, and thermoplastic polyurethanes.

5. A pigment formulation as claimed in claim 1, containing from 0.1 to 40% by weight of component (A), from 60 to 99.9% by weight of component (B) and (B'), and from 0 to 8% by weight of component (C).

6. A process for preparing a pigment formulation as claimed in claim 1, which comprises
   a) dispersing the pigments (A) in a solution of the polymer (B) in an organic solvent in the presence or absence of a dispersant (C), and
   b) applying as a layer the dispersion produced in step a), with removal of the solvent, to granules of the thermoplastic polymer (B').

7. A process as claimed in claim 6, wherein the pigments (A) are dispersed in succession in the solution of the polymer (B), using different dispersing methods if desired.

8. A process for coloring a polymer molding compound, which comprises incorporating a pigment formulation as claimed in claim 1 into the polymer molding compound.

9. A process as claimed in claim 8, used to color films, sheets, profiles, shaped parts, including injection moldings, or fibers.

10. A process as claimed in claim 8, used to color the coloring layer of composite sheets and films.

11. A polymer molding compound colored with a pigment formulation as claimed in claim 1.

12. A polymer molding compound as claimed in claim 11, based on polymers comprising acrylic resins, styrene polymers, polycarbonates, polyesters, polyamides, polyethersulfones, polysulfones, polyvinyl chloride, polyetherimides, polyetherketones, polyphenylene sulfides, polyphenylene ethers or blends thereof, each of which may comprise additives.

13. A composite film comprising at least one coloring layer colored with a pigment formulation as claimed in claim 1.

14. A composite film as claimed in claim 13, comprising substantially in this order:
   (1) at least one substrate layer (1) comprising ASA polymers, ABS polymers, polycarbonates, polyesters, polyamides, polyether imides, polyether ketones, polyphenylene sulfides, polyphenylene ethers or blends thereof, colored if desired with the pigment formulation,
   (2) at least one coloring interlayer (2) comprising polymer molding compounds of acrylic resins, styrene polymers, polycarbonates, polyesters, polyamides, polyether sulfones, polysulfones, polyvinyl chloride, polyurethanes or blends thereof, colored with the pigment formulation, and
   (3) at least one translucent or transparent top layer (3) comprising poly(meth)acrylates, high impact poly(meth)acrylates, fluorine (co)polymers, ABS polymers, polycarbonates, polyethylene terephthalate, SAN copolymers or blends thereof.

15. A composite film as claimed in claim 13, comprising substantially in this order:
   (1) at least one coloring substrate layer (1') comprising ASA polymers, ABS polymers, polycarbonates, polyesters, polyamides, polyether imides, polyether ketones, polyphenylene sulfides, polyphenylene ethers or blends thereof, colored with the pigment formulation, and
   (2) at least one translucent or transparent top layer (3) comprising poly(meth)acrylates, high impact poly(meth)acrylates, fluorine (co)polymers, ABS polymers, polycarbonates, polyethylene terephthalate, SAN copolymers or blends thereof.

16. A composite film as claimed in claim 14, comprising a substrate layer containing ASA polymers or containing a blend of ASA polymers and polycarbonates.

17. A shaped plastic part, substantially comprising a composite film as claimed in claim 14 which limits at least one surface of the shaped plastic part and is connected by way of the substrate layer to a back-embossed, injection-backmolded, back-cast or foam-backed polymer molding material.

18. A shaped plastic part as claimed in claim 17, comprising an interior and/or exterior bodywork part, a domestic and/or electrical appliance casing, a battery support, a seat shell, a facade panel, a mobile-telephone casing or a floor covering.

19. A composite film as claimed in claim 15, comprising a substrate layer containing ASA polymers or containing a blend of ASA polymers and polycarbonates.

20. A shaped plastic part, substantially comprising a composite film as claimed in claim 15 which limits at least one surface of the shaped plastic part and is connected by way of the substrate layer to a back-embossed, injection-backmolded, back-cast or foam-backed polymer molding material.

21. A shaped plastic part as claimed in claim 20, comprising an interior and/or exterior bodywork part, a domestic and/or electrical appliance casing, a battery support, a seat shell, a facade panel, a mobile-telephone casing or a floor covering.

* * * * *

UNITED STATES PATENT AND TRADEMARK OFFICE
CERTIFICATE OF CORRECTION

PATENT NO. : 7,351,474 B2
APPLICATION NO. : 10/416756
DATED : April 1, 2008
INVENTOR(S) : Guenter Etzrodt et al.

Page 1 of 1

It is certified that error appears in the above-identified patent and that said Letters Patent is hereby corrected as shown below:

Column 11, line 56, "composed of 45 from 15 to 99.9% by weight,"
    should read -- composed of from 15 to 99.9% by weight, --.

Column 14, line 34, "determined in accordaance with"
    should read -- determined in accordance with --.

Column 19, line 13, "preformed y thermoforming,"
    should read -- preformed by thermoforming, --.

Signed and Sealed this

Second Day of December, 2008

JON W. DUDAS
*Director of the United States Patent and Trademark Office*